United States Patent
Klein (10) Patent No.: US 8,670,783 B2
(45) Date of Patent: Mar. 11, 2014

(54) APPARATUS AND METHOD FOR UTILIZING LOCATION CAPABLE TWO-WAY RADIO TRANSCEIVERS AS GEO-FENCE POSTS

(75) Inventor: David E. Klein, Davie, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 56 days.

(21) Appl. No.: 13/243,182

(22) Filed: Sep. 23, 2011

(65) Prior Publication Data

US 2013/0079028 A1   Mar. 28, 2013

(51) Int. Cl.
*G01S 19/31* (2010.01)
*G08B 1/08* (2006.01)

(52) U.S. Cl.
USPC ............ 455/456.1; 342/357.71; 340/539.13

(58) Field of Classification Search
USPC ......... 342/357.71, 357.74; 340/988, 539.13; 701/201, 213, 215; 715/733; 455/456.1
See application file for complete search history.

(56) References Cited

U.S. PATENT DOCUMENTS

| | | | |
|---|---|---|---|
| 5,455,851 A * | 10/1995 | Chaco et al. | 379/38 |
| 7,398,153 B2 | 7/2008 | Workman et al. | |
| 7,498,985 B1 | 3/2009 | Woo et al. | |
| 7,680,590 B2 | 3/2010 | Sanqunetti | |
| 7,848,765 B2 | 12/2010 | Phillips et al. | |
| 8,035,560 B1 * | 10/2011 | Glodz et al. | 342/357.71 |
| 8,229,473 B1 * | 7/2012 | De La Rue | 455/456.5 |
| 2002/0186135 A1 * | 12/2002 | Wagner | 340/573.1 |
| 2002/0196151 A1 | 12/2002 | Troxler | |
| 2005/0143096 A1 | 6/2005 | Boesch | |
| 2005/0156715 A1 * | 7/2005 | Zou et al. | 340/426.19 |
| 2009/0009321 A1 * | 1/2009 | McClellan et al. | 340/539.13 |
| 2010/0017126 A1 | 1/2010 | Holcman et al. | |
| 2010/0066545 A1 * | 3/2010 | Ghazarian | 340/573.4 |
| 2010/0253508 A1 * | 10/2010 | Koen et al. | 340/539.13 |
| 2011/0063138 A1 | 3/2011 | Berkobin et al. | |
| 2011/0066366 A1 | 3/2011 | Ellanti et al. | |
| 2011/0178811 A1 * | 7/2011 | Sheridan | 705/1.1 |
| 2012/0268269 A1 * | 10/2012 | Doyle | 340/539.13 |

OTHER PUBLICATIONS

International Search Report and Written Opinion for related counterpart International Patent Application No. PCT/US20112/053940 mailed on Dec. 12, 2012.

* cited by examiner

*Primary Examiner* — Nizar Sivji
(74) *Attorney, Agent, or Firm* — Barbara R. Doutre (57) ABSTRACT

An infield radio communication device (100) operates in a communication system (200, 300) to dynamically identify and/or share location information to form and update a geo-fence or border. A single infield radio device (100) can be used to provide electronic location markers which can be updated in real time to create a geographical fence or border as the device (100) changes location. Additional infield radio device(s) (100) can also be used to share location markers for the creation of the geographical fence or border.

28 Claims, 4 Drawing Sheets

APPARATUS AND METHOD FOR UTILIZING LOCATION CAPABLE TWO-WAY RADIO TRANSCEIVERS AS GEO-FENCE POSTS

FIELD OF THE INVENTION

The present invention relates generally to communication devices and more to the formation of geo-fences within a communication system.

BACKGROUND

Position reporting devices are frequently used to locate and report a position of a person or object. A typical device includes Global Positioning System (GPS) technology or similar location module potentially linked to a mobile communication system for transmitting the location information. Position devices operating within location based services, such as fleet tracking or the like link location back to a central management system. Location services may also target appropriate content to infield users based upon the users' current position. These services assume the field units are of two possible types, uniquely tracked transmitters or content receivers.

The first type of service focuses on devices that are linked to fleet tracking services, criminal location tracking bracelets, or similar services where the device is monitored against a set of location grids or other logical tracking areas. These devices are persistent elements in a defined system and act as movable elements in that system. The second type of service focuses on devices that are not persistently tracked in a defined grid but linked against a set of content tied to particular locations.

In both cases, the location enabled devices post location into a service that already contains predefined areas or other constructs that create areas linked to predetermined responses. For example, some responses might include sending an alert when a criminal leaves a preset area or delivering content to someone who is in proximity to a store.

Both the uniquely tracked transmitter and content receiver approaches require the formation of the predefined areas. The formation of these predefined areas relies on the manual drawing of an area or line in the tracking tool, which is highly speculative and error prone as the individual drawing the area does not have direct contact with the current situation within which the devices are being used. Additionally, there is no appropriate means to update the area.

Accordingly, there is a need for an improved approach to location awareness.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in apparatus components and method steps in which a communication device provides the capability for coordinating, determining, and actively reporting a position. Location capable two-way radio transceivers generate location markers which operate as geo-fence posts to define a regional geo-fence or border. The geo-fence posts provide dynamic regions that can be set and changed by infield users in the actual environment. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Briefly, there is provided herein an infield communication device which provides portable location reporting either as a stand alone unit or to other devices, systems, or recording means. The embodiments to be provided herein allow a single infield device or multiple infield devices to be used to generate location information for a geo-fence or border. Uniquely identified devices can mark a region while a single device can submit multiple location details in a process to define a region or border. The various embodiments facilitate the creation and maintenance of geo-fences and borders for improved public safety applications and asset management.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with location sensing circuits and certain non-processor circuits, some, most, or all of the functions of a location sensing system and method of storing and sharing location information described herein. The non-processor circuits may include, but are not limited to, a radio receiver, a radio transmitter, signal drivers, clock circuits, power source circuits, and user input devices. As such, these functions may be interpreted as steps of a method to perform sharing of device location details. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Figure 1:
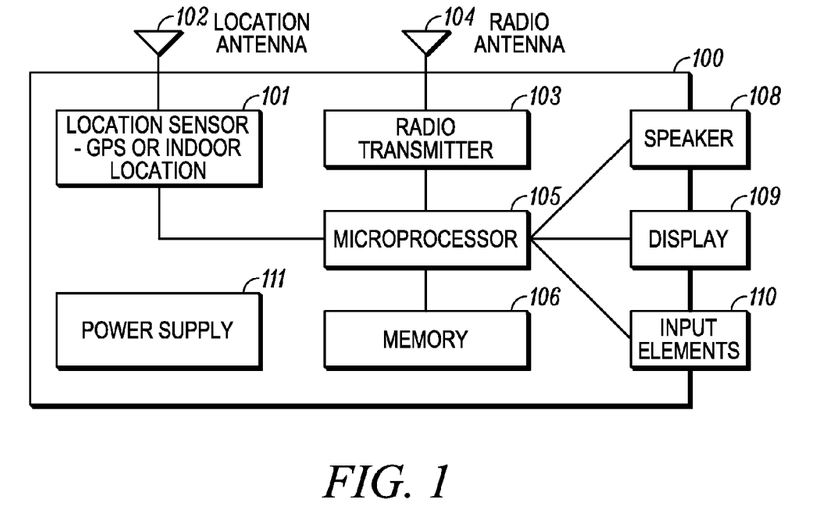
FIG. 1 is a block diagram a communication device operating in accordance with the various embodiments.

FIG. 1 is a block diagram of a portable radio communication device 100, operating in accordance with the various embodiments. Portable radio communication device 100 is portable either via being hand carried or vehicle installed and provides location determination and sharing capabilities. Portable radio communication device 100 comprises a location sensor 101 that can track location via location antenna 102 from outdoor location technology, such as GPS global positioning systems (GPS) or the like, or from indoor location technology, such as dead reckoning, beaconing, chirp with time or arrival, or other personal inertial navigation technology. This location capability supplies information to a microprocessor 105 and associated memory 106 such that the location can be recorded or directly shared via an associated radio transceiver 103 and radio antenna 104. While shown as two antennas 102, 104, the radio 100 may utilize one antenna or more than two antennas for transceiver operations and location tracking. Coupled to the microprocessor 105 are associated circuits for system management such as power supply 111, user interface elements 110 and audio and visual interface elements 108, 109 respectively.

When user input is received via a user interface 108, 109 and/or 110 of the portable radio communication device 100, such as keypad, button or voice command, the microprocessor 105 calculates a location from the location sensor 101 (indoor or outdoor) and transmits the location via the communication radio transmitter.

Figure 2:
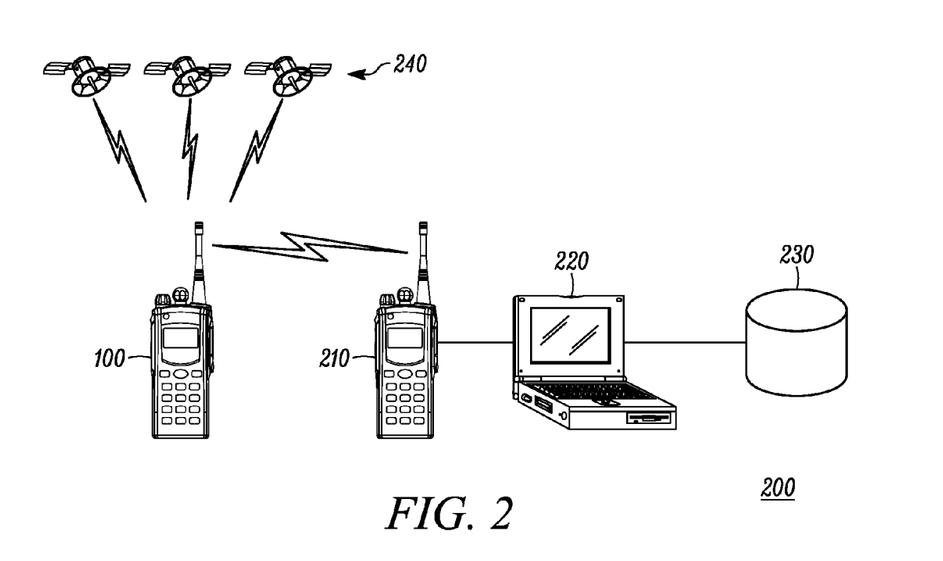
FIG. 2 is a diagram of a communication system operating in accordance with the various embodiments.

FIG. 2 is a diagram of a communication system 200 operating in accordance with the various embodiments. Communication system 200 is preferably a public safety communication system such as operating within Association of public Safety Communication Officials (APCO), TErrestrial Trunked Radio (TETRA), digital mobile radio (dmr), or 802.xx. Communication system 200 comprises portable radio communication device 100 of FIG. 1, also referred to as an infield radio device, with location sensing capabilities. In accordance with this embodiment infield radio device, interfaces with the satellite based position tracking system 240 and other communication devices 210 to provide ad hoc radio monitoring with connectivity to a computer processing unit 220, such as a laptop, and permanent location recording database, or storage device 230. The satellite based position tracking system 240 may be for example, a Global Positioning Satellite (GPS) delivering location data to the location sensing system 101 of the infield radio device 100. The infield radio device 100 utilizes its communication capabilities to share location with local peers via other communication devices 210 that would record and view location details that create a geo-fence defined region or border via the processing unit 220 and storage device 230. This processor based approach having a software based database retains location information and any other associated information, such as radio ID, event data or time based data associated with the location information, for the generation of the geo-fence or border. Thus, radio 210 can operate as a conduit to the processing unit 220.

Figure 3:
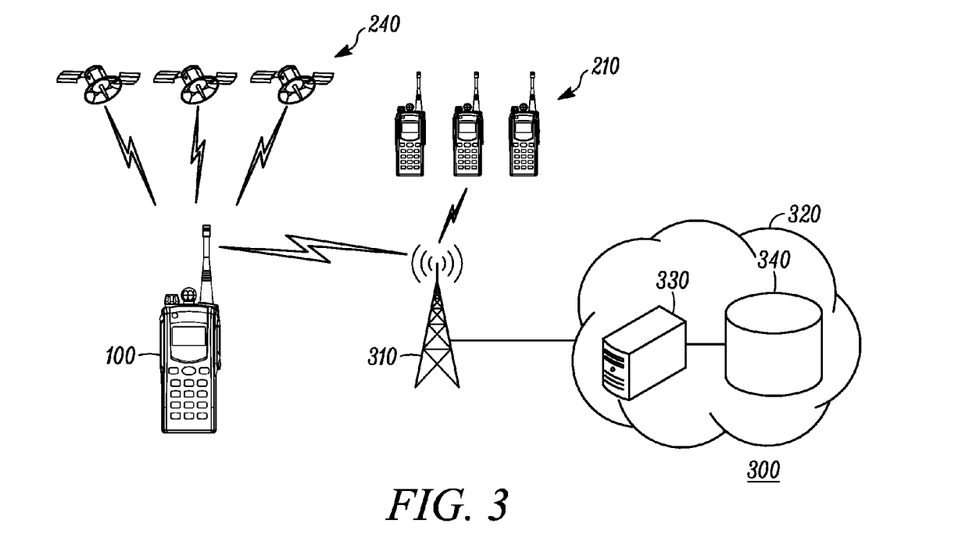
FIG. 3 is a diagram of another communication system operating in accordance with the various embodiments.

FIG. 3 is a diagram of another communication system 300 operating in accordance with the various embodiments. Communication system 300 is preferably a public safety communication system such as operating within APCO, TETRA, dmr, or 802.xx. Communication system 300 comprises radio communication device(s) 100 with location sensing capabilities 101 with satellite based position tracking system 240 and an infrastructure based radio monitor with connectivity to a network based computer processing unit and permanent location recording database. As in the previous system 200, system 300 comprises the infield radio device 100 that is portable either via hand carried or vehicle installed in addition to the satellite based position tracking system 240, such as Global Positioning Satellite (GPS), delivering location data to the location sensing system 101 included in the infield radio device 100. The portable infield radio device 100 utilizes its communication capabilities to share location with a central infrastructure 310 that records and makes information details for a created geo-fence defined region or border available for clients within the infrastructure's network cloud 320. This location storage approach includes a central processor or network server 330 that can manage the location information stored in a central storage database 340.

The infield radio device 100 with location sensing operating in accordance with the embodiments allows an infield user to initiate the recording of a location and sharing the location with peers 210 or central server 320 such that the location can be added into the definition of a region or border. The utilization of the infield radio device 100 allows field users to ensure that location marking is accurate or to update the location marking after some predetermined time if the region or border has changed. This live behavior is enabled and updated with the use of the location sharing over the communication system 200, 300 within which the infield radio device 100 operates. This approach also allows other users within the system, such as peer communication devices 210 or servers 220, 320, to give directions or indicators, such as verbal instructions, over the air command protocols, or other methods of device interaction and control, such that the infield radio device 100 knows to share a location. With this level of control, the infield radio device 100 is not negatively impacted by any location sensing circuits from a battery and power perspective. The user interface 108, 109 and/or 110 of the infield radio device 100 also enables the field user to have control over aspects such that they can utilize the current position and specify additional location points for the geo-fence or border by indicating range, geometric shapes, or other information that could only been known by the user in the field.

In accordance with the embodiments of FIGS. 2 and 3, the identity and location of a geo-fence post is stored in the database. The communication systems 200, 300 may further determine whether each infield device has permission to provide geo-fence markers for the formation of a geo-fence or border based on the infield device's identification (ID). The identification of the device representing the geo-fence post provides a key piece of data for enabling time based updates for synchronization management. These updates facilitate live, real-time adjustment of geo-fences or borders by individual users in the field for more accurate/timely updates to the fence or border. Once the fence is established, the geo-fence posts do not need to be uniquely tracked or be content receivers. The geo-fence posts may operate as part of a time based state machine for time or event based fence updating or as a single or limited set of users or system initiated location geo-fence post markings.

Figure 4:
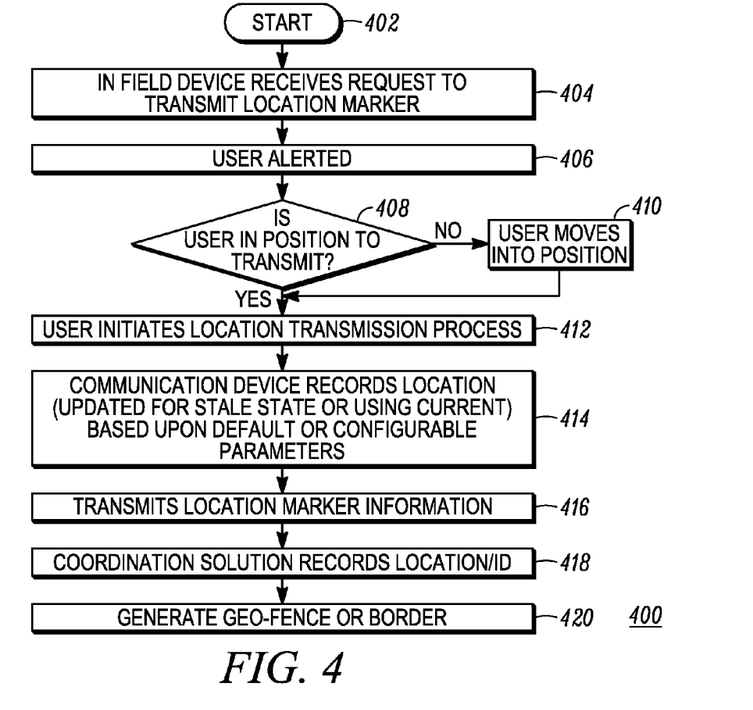
FIG. 4 is a flowchart of a method for processing a request to transmit an appropriate location code in accordance with the various embodiments.

FIG. 4 is a flowchart of a method 400 for processing a request to transmit an appropriate location code in accordance with the various embodiments. Method 400 allows an infield user to utilize the location sensing communication capability of the portable infield radio device 100 to coordinate and define an accurate geo-fence or border by acting as a live geo-fence post. Method 400 starts at 402 by initiating a request from a coordinator to each infield radio communication device (user or via a group discussion) to transmit a location marker. Once the users are alerted to the request (e.g. via an audio, visual, haptic, or other alert) a determination is made at 408 as to whether the user is correctly positioned to transmit. If the infield radio is not properly positioned, the infield user of the radio is given an opportunity to move into an appropriate position at 410, prior to transmitting geo-fence post coordinates. Once positioned, the location transmission process is initiated by the infield user at 412. The infield radio device processes the location request and determines whether the current location data is appropriate for the current event at 414. This determination can be based on a default conditions or modified via configurable parameters that are either shared directly from the location request or via a pre-configured level of accuracy. As such, both the infield user at 408 and the infield radio at 414 are involved in the determination of the geo-fence post. Once the appropriate level of accuracy is achieved at 414, the device can transmit at 416 the location and also the user identification, if configured to do so. The location marker (and user/radio ID if applicable) is recorded at 418. The recordation as well as data management are done by the processor (FIGS. 2 and 3, 220, 330) for the generation of the geo-fence or border at 420 via either local peer or infrastructure based communication. The radio ID can further be used in determining whether the infield device has permission to provide geo-fence markers for the formation of the geo-fence or border.

Figure 5:
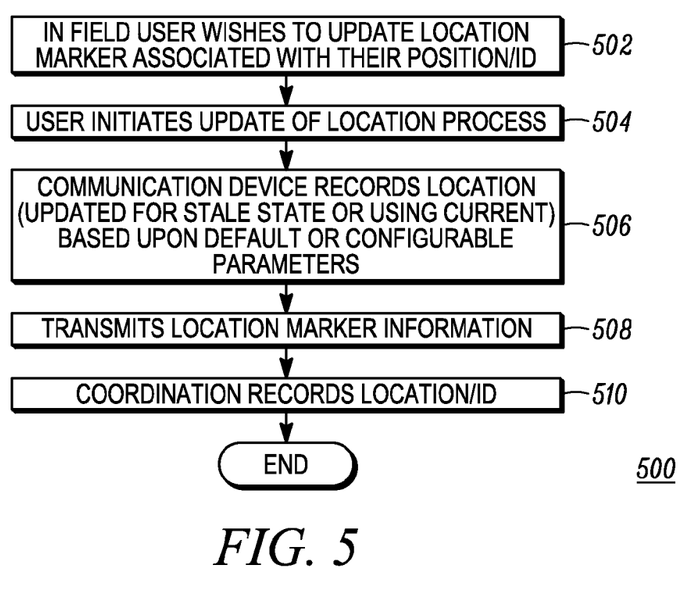
FIG. 5 is a flowchart of a method for transmitting an appropriate location code in accordance with the various embodiments.

FIG. 5 is a flowchart of a method 500 for transmitting an appropriate location code in accordance with the various embodiments. Method 500 provides an extension to method 400 by providing additional capability for the infield user wishing to update the location information associated with their previous submission at 502. This updated location information can be controlled via a linkage to a radio or user ID or other unique type of identifier. The update of the location data is initiated at 504 by the infield user utilizing the location sensing capability of infield radio device 100 to submit an updated location data. When the infield radio device 100 receives the request from the user at 504, the device records the location at 506 and re-evaluates the accuracy level of the location information and manages the location sensing such that the location accuracy is acceptable to either the pre-configured level or accuracy level previously utilized for the previous location submission. The device then transmits at 508 the updated location data to the processor (e.g. laptop 220/server 330) for the recording of the location and management of the data at 510 for the generation of the geo-fence or border via either local peer or infrastructure based communication methods. Method 500 can be extended such that the location request is also be generated from a remote location, similar to the initial method 400 of FIG. 4.

Figure 6:
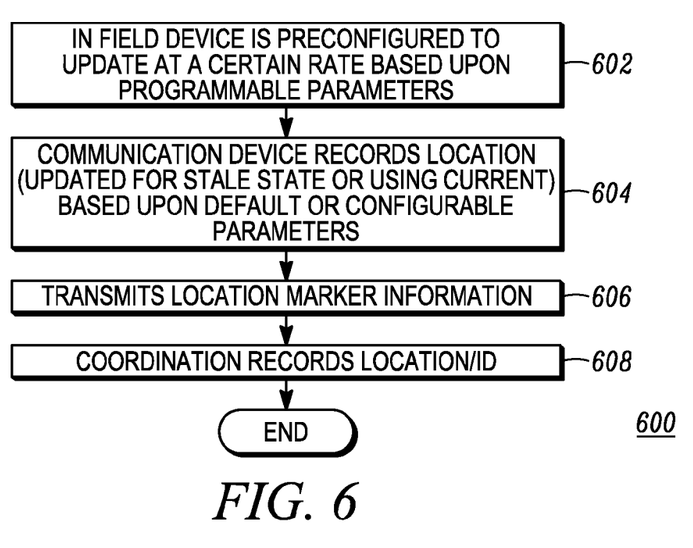
FIG. 6 is a flowchart of a method for transmitting an appropriate location code in accordance with the various embodiments.

FIG. 6 if a flowchart of a method 600 providing an extension to the method 400 with the addition of initiating a request that is further qualified as a time based location update process. The infield device is preconfigured to update at a certain rate based upon programmable parameters at 602. The time based location update process allows an infield user to create the geo-fence defined border without having additional users involved with defining the location geo-fence posts. Once the initiation request is received by the location sensing portable communication device and potentially acknowledged by the users, if so configured), the device records the current location at 604 and processes the quality of accuracy of the current location data to ensure that the location data is of appropriate quality. The quality processing again can involve default or configurable parameters. Once accuracy levels are achieved at 604, the device transmits the location back to the location processing and storage at 606. This time based approach allows the location sensing sensor 101 to periodically check and provide accurate location data for transmission to the location processing and storing devices (e.g. 220/230 or 330/340).

The method of FIG. 6 can also be extended such that the infield user manually re-initiates the location sensor 101 to generate multiple location markers that can be shared with the location processing and storing device (e.g. 220/230 or 330/340). This embodiment utilizes different unique location geo-fence post identifiers other than a user identifier. Like the other updating processes of methods 400, 500, 600, these unique identifiers can be generated via time, infield user managed, or initiator defined.

The method 400 and various extension thereof 500, 600 enable a portable communication device with location sensing capabilities to be utilized in a system to establish a communication boundary in which a user can indicate a geo-fence post and communicate details of the fence post to a central location or shared amongst several peers to generate a geo-fenced area or defined geo-border in real time. The methods allow areas to be identified, such as marking an area of high risk, identifying an area requiring specific access levels or permissions, or part of a living border associated with other management tasks that require accurate area/location identification potentially linked to specific timeframes. The portable device operating in accordance with the various embodiments allows infield users to mark or remark a location or multiple locations for ad hoc creation of a region or border along with other similar devices or a single device being used to mark multiple locations.

The generation and reporting of the geo-fence provided by the various embodiments allows for an accurate visual, such as on a display of processing unit 220 of FIG. 2, of a geo-fence area or geo-fence border. The location marking generated by the two-way radio transceivers operating as geo-fence posts can be applied in many different environments including, but not limited to, public safety, utility, and mining. A few practical examples are provided in conjunction with FIGS. 7 and 8.

Figure 7:
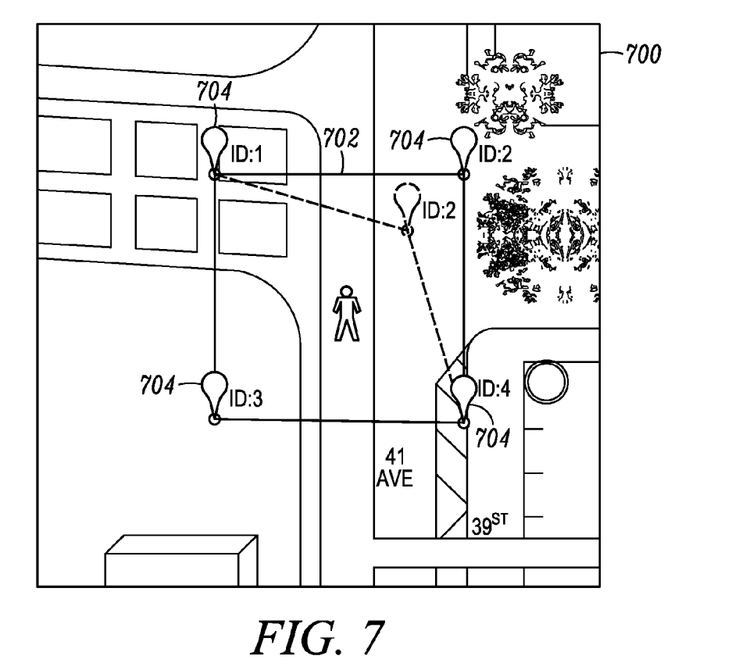
FIG. 7 is a diagram illustrating an example of a geo-fence area formed in accordance with the various embodiments.

FIG. 7 is a diagram 700 illustrating an example of a geo-fence area formed in accordance with the various embodiments. For public safety, there are times when officers want to create an ad hoc geo-fence such that the incident commander is fully aware of the position of the public safety units when creating a control area, such as when tracking individuals or containing areas during civil unrest. The ability to accurately report and generate a geo-fence 702 from actual posted users (radios ID: 1, ID: 2, ID: 3, ID: 4) 704 allows an incident commander to identify gaps or areas e.g. via laptop 220 of FIG. 2. The users of the radios 704 can provide real time updates to the geo-fence 702. In this scenario radio ID:2 has moved outward from his original location.

Figure 8:
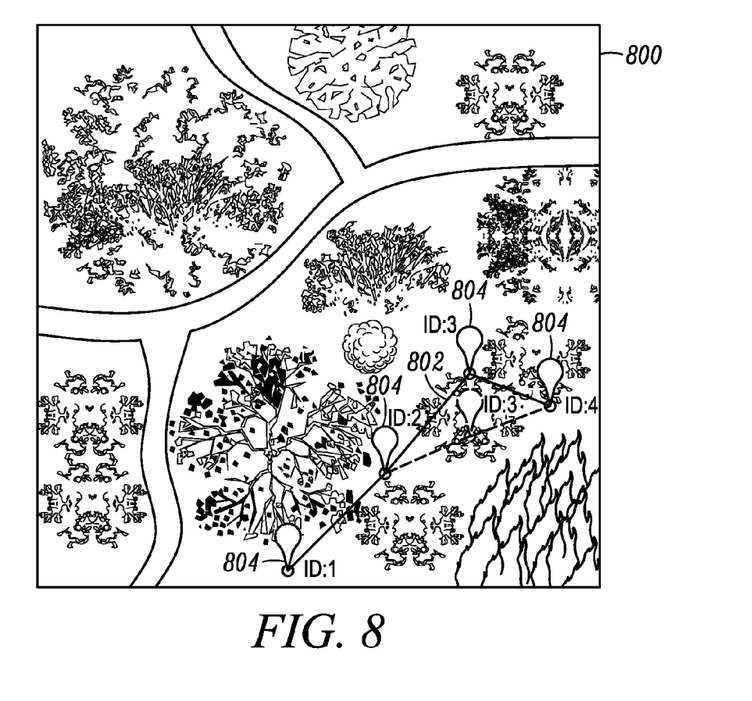
FIG. 8 is a diagram illustrating an example of geo-fence border formed in accordance with the various embodiments.

FIG. 8 is a diagram 800 illustrating an example of geo-fence border formed in accordance with the various embodiments. During forest fire scenarios, for example, the ability to provide an accurate visual of a border 802 can facilitate the management of the fire. For example, in scenarios where the area with the most intense fire moves over time, it is difficult to understand where precautionary fire burns should placed to manage the wildfire. In this scenario, radio users are now able to update an incident commander with a control border 802 is being created to manage the fire. The users already carry communication devices 804 (ID: 1, ID: 2, ID: 3, ID: 4) and the added functionality of location reporting to a central or distributed tracking device allows the incident commander to get an accurate visual of the border, such as via laptop 220. Users can provide real time updates to adjust the border. For example, in this illustration radio ID: 3 has moved outward from its original location thereby moving the border outward as well.

For utility and enterprise environments in which users deal with equipment or materials, such as mining or other material and vehicle management, the ability to generate regions of control is extremely important. For example, the users can manage a pile of dirt that is rich in minerals or semi-precious stones, and the ability to post users with location reporting communication devices allows them to create an ad hoc geo-fence given the current state of the material. If the material is moved, another geo-fence can be created as the location marking capable devices are operating in the field.

Accordingly, an improved location awareness approach for infield users has been provided to identify a physical location and share that location in a manner that can be recorded such that a highly detailed mapping of key locations or areas can be documented and utilized for location services. The infield location devices are able to share device/user identification IDs with the location service for detailed location correlation or other advanced location services. The infield location device leverages voice capable communication systems for multiple methods of coordinating location positions and times for location updates.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A portable radio communication device operating as an infield device within a communication system, the portable radio communication device comprising:
a microprocessor;
a two-way radio transceiver coupled to the microprocessor;
a location sensor coupled to the microprocessor;
the microprocessor, two-way radio transceiver and location sensor providing a location capable two-way radio transceiver operating as a geo-fence post and communicating with a plurality of other infield devices within the communication system operating as geo-fence posts and located at a plurality of locations to generate a geo-fence or boundary defining a dynamic region, wherein the dynamic region is set and changed in response to a change in location of one or more of the plurality of other infield devices operating as geo-fence posts; and
the communication system further comprising:
a network server that sends time based requests to the plurality of infield devices requesting updated location information with which to generate an updated geo-fence.

2. The portable communication device of claim 1, wherein the dynamic region is set and changed in response to input from a infield user of the portable radio communication device.

3. The portable radio communication device of claim 1, further comprising: location sharing capabilities for sharing geo-fence post information to other infield devices within the communication system.

4. The portable radio communication device of claim 1, wherein inputs from both an infield user of the portable communication device and location information data generated by the location capable two-way radio transceiver are used to operate the portable communication device as a geo-fence post.

5. The communication system of claim 1, wherein the portable communication device generates a plurality of geofence posts over time to create a geo-fence or border.

6. The communication system of claim 1, wherein the portable communication device generates a plurality of geo-fence posts in response to predetermined events to create a geo-fence or border.

7. A communication system, comprising:
a plurality of infield devices operating as geo-fence posts and providing two-way radio capability, each of the plurality of infield devices having a radio ID and location sensing capability for generating location information in response to an input to each of the plurality of infield devices, the location information from each of the plurality of infield devices located at a plurality of locations being used to generate a geo-fence or border that defines a dynamic region; and
the infield devices providing dynamic live, real-time updates to the geo-fence or border in response to a change in the location information of one or more of the plurality of infield devices operating as geo-fence posts; and
a network server sending time based requests to the plurality of infield devices, the network server requesting updated location information with which to generate an updated geo-fence or border.

8. The communication system of claim 7, wherein the network server comprises a central storage database, the central storage database storing the location information and the network server managing the location information stored in the central storage database.

9. The communication system of claim 7, wherein users of the plurality of infield devices enter the updated location information in response to the requests.

10. The communication system of claim 9, wherein the updated geo-fence or border provide synchronization management of assets within the communication system.

11. The communication system of claim 7, wherein updates to the geo-fence or border are based on an input into the plurality of infield devices, further wherein the input originates from individual users within the communication system.

12. The communication system of claim 7, wherein updates to the geo-fence or border are also event based.

13. The communication system of claim 7, wherein once the geo-fence is established, the location information is no longer generated until a subsequent input to the infield device is received.

14. The communication system of claim 7, wherein the geo-fence is formed in response to user or system initiated location geo-fence post requests to the infield devices.

15. The communication system of claim 7, wherein inputs from both an infield user of the infield device and the location information generated by the infield device are used to provide the geo-fence or border.

16. The communication system of claim 7, wherein the communication system determines whether the infield device has permission to define the geo-fence or border.

17. A method for determining a communication boundary, comprising:
 receiving a request, at a plurality of infield communication devices located at a plurality of locations, to generate location information;
 calculating a location of the plurality of infield communication devices using the plurality of infield communication devices;
 transmitting, by the plurality of infield communication devices, the location information as a plurality of geo-fence markers at the plurality of locations;
 providing dynamic, live, real-time updates to the geo-fence markers at the plurality of locations thereby creating geo-fence posts, wherein the geo-fence posts define a dynamic region,
 forming a geo-fence or border in response to the geo-fence posts; and
 sending time based requests from a network server to the plurality of infield devices, the network server requesting updated location information with which to generate an updated geo-fence or border.

18. The method of claim 17, further comprising:
 updating the geo-fence based on both user input to the plurality of infield communication devices and the location information calculated within the plurality of infield communication devices.

19. The method of claim 17, wherein the updating is also event based.

20. The method of claim 17, further comprising:
 determining whether each of the plurality of infield communication devices has permission to provide geo-fence markers for the formation of a geo-fence or border based on ID of the infield communication device.

21. The method of claim 17, further comprising:
 identifying gap areas when at least one of the plurality of infield communication devices moves out of the dynamic region defined by the geo-fence posts.

22. The method of claim 17, further comprising:
 providing a visual display of the geo-fence or border on a network server having a central storage database, the central storage database storing the location information and the network server managing the location information stored in the central storage database.

23. The method of claim 17, further comprising:
 creating an ad hoc geo fence or border using the geo-fence markers associated with one or more infield devices.

24. The communication system of claim 5, wherein an infield user of the portable communication device manually re-initiates the location sensor to generate the plurality of geo-fence posts.

25. The communication system of claim 5, wherein the portable communication device re-initiates the location sensor to generate the plurality of geo-fence posts in response to an infield input to the portable communication device.

26. A communication system, comprising:
 a plurality of infield devices providing two-way radio capability, each of the plurality of infield devices having a radio ID and location sensing capability for generating location information in response to an input to each of the plurality of infield devices, the location information from each of the plurality of infield devices located at a plurality of locations being used to generate a geo-fence or border that defines a dynamic region;
 a network server sending time based requests to the plurality of infield devices requesting updated location information with which to generate an updated geo-fence or border; and
 the updated geo-fence or border providing synchronization management of assets within the communication system.

27. A portable radio communication device operating as an infield device within a communication system, the portable radio communication device comprising:
 a microprocessor;
 a two-way radio transceiver coupled to the microprocessor;
 a location sensor coupled to the microprocessor;
 the microprocessor, two-way radio transceiver and location sensor providing a location capable two-way radio transceiver operating as a geo-fence post and communicating with a plurality of other infield devices within the communication system operating as geo-fence posts and located at a plurality of locations to generate a geo-fence or boundary defining a dynamic region,
 a network server sending time based requests to the plurality of infield devices requesting updated location information with which to generate an updated geo-fence or boundary; and
 the updated geo-fence or boundary providing synchronization management of assets within the communication system.

28. A method for determining a communication boundary within a communication system, comprising:
 receiving a request, at a plurality of infield communication devices located at a plurality of locations, to generate location information;
 calculating a location of the plurality of infield communication devices using the plurality of infield communication devices;
 transmitting, by the plurality of infield communication devices, the location information as a plurality of geo-fence markers at the plurality of locations;
 providing dynamic, live, real-time updates to the geo-fence markers at the plurality of locations thereby creating geo-fence posts;
 forming a geo-fence or border in response to the geo-fence posts;
 sending time based requests from a network server to the plurality of infield communication devices, the network server requesting updated location information with which to generate an updated geo-fence or border; and the updated geo-fence or border providing synchronization management of assets within the communication system.

\* \* \* \* \*

UNITED STATES PATENT AND TRADEMARK OFFICE
CERTIFICATE OF CORRECTION

| | | |
|---|---|---|
| PATENT NO. | : 8,670,783 B2 | Page 1 of 1 |
| APPLICATION NO. | : 13/243182 | |
| DATED | : March 11, 2014 | |
| INVENTOR(S) | : Klein | |

It is certified that error appears in the above-identified patent and that said Letters Patent is hereby corrected as shown below:

In the claims

In Column 8, Line 17, in Claim 2, delete "portable communication" and insert -- portable radio communication --, therefor.

In Column 8, Line 48, in Claim 7, delete "dynamic" and insert -- dynamic, --, therefor.

Signed and Sealed this
Third Day of May, 2016

Michelle K. Lee
*Director of the United States Patent and Trademark Office*